Jan. 31, 1950 J. MARQUES 2,496,100
AUTOMATIC STABILIZER FOR AIRPLANES
Filed Jan. 16, 1945 3 Sheets—Sheet 3
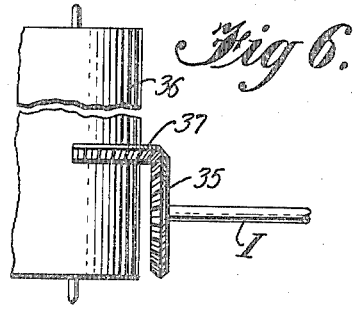
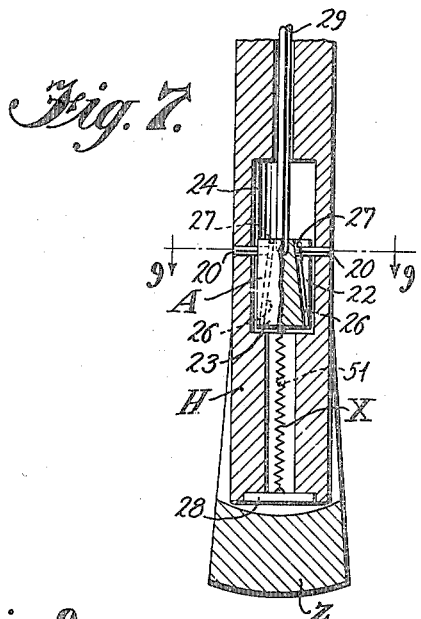
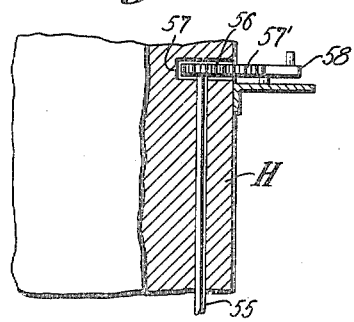
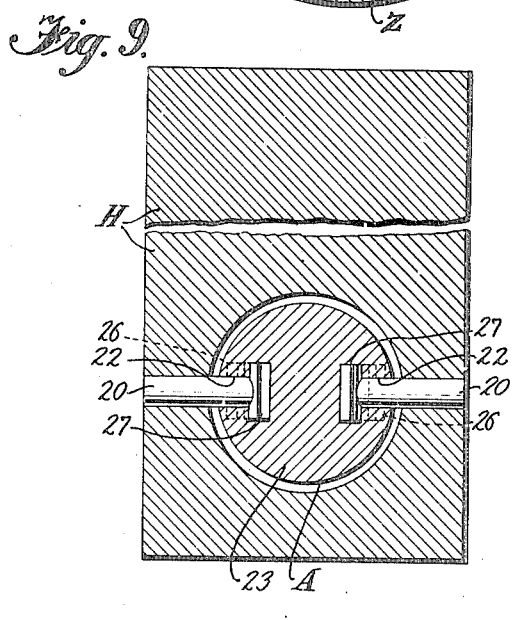
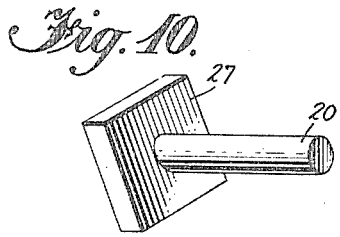
INVENTOR.
Jose Marques
BY
Watson Cole, Grindle
& Watson ATTORNEYS Patented Jan. 31, 1950

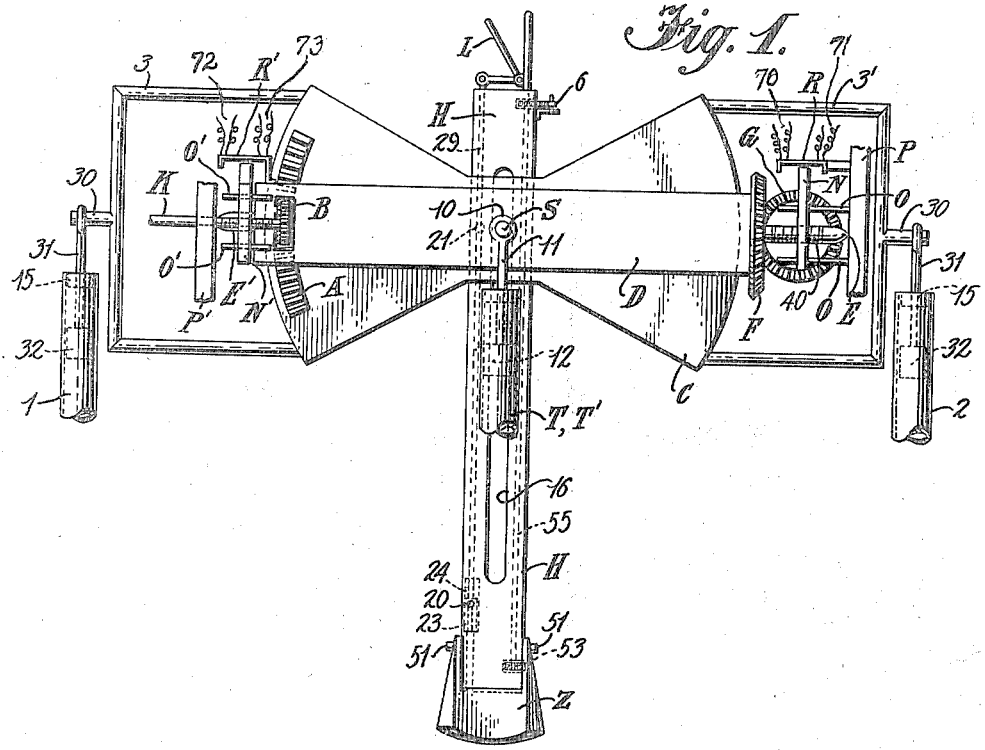
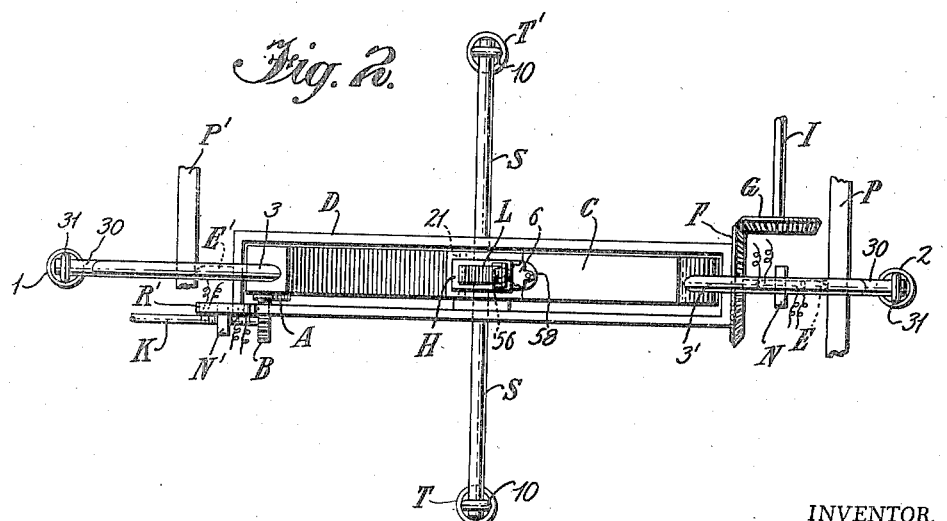

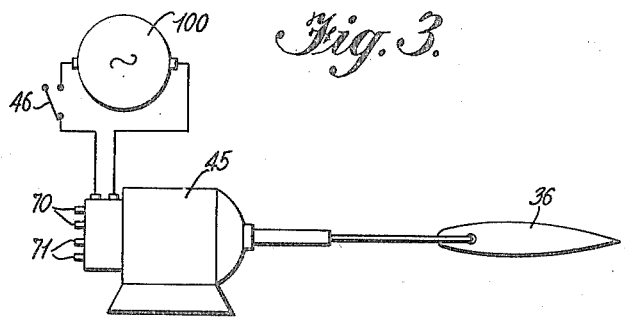
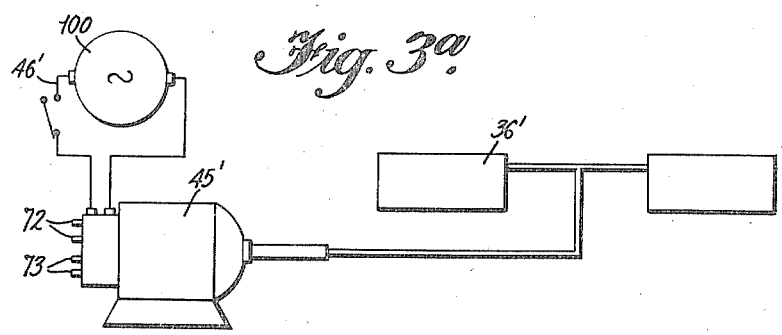
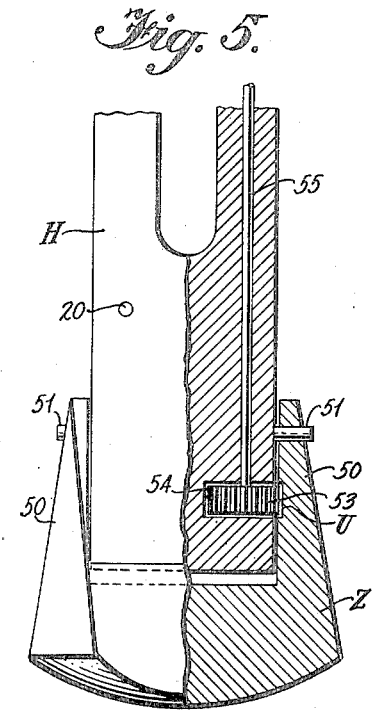
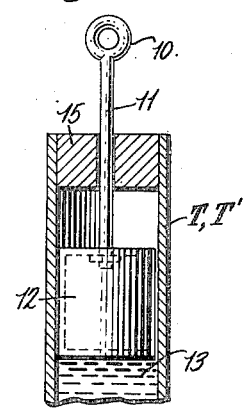

2,496,100

UNITED STATES PATENT OFFICE 2,496,100

AUTOMATIC STABILIZER FOR AIRPLANES

José Marques, Casas Novas, Sao Joao de Areias,
Santa Comba Dao, Portugal

Application January 16, 1945, Serial No. 573,002

7 Claims. (Cl. 244—80)

This invention relates to stabilizers for aircraft and has for its general object the provision of an automatic stabilizer for setting the controls of an airplane so as to maintain or restore the condition of horizontal flight, whenever the pilot's hand control is released.

More specifically, it is an object of the invention to provide a device which is embodied in the hand control lever assembly and adapted to control the horizontal steering of the plane by the voluntary action of the pilot; but when such action ceases the automatic control by means of the device commences.

In its preferred embodiment, the invention contemplates the provision of an automatic stabilizing device applied to the usual hand control lever or stick positioned in front of the pilot's seat and extending in a plane generally transverse to the plane of the airplane. The device is characterized mainly by a pendulum, the center of gravity of which may be set at different heights in relation to its pivotal point of suspension. Means are also provided for altering the positions of the vertical axis of the pendulum in accordance with the speed of the aircraft, so as automatically to control the horizontal rudder or elevator and the ailerons so that the craft continually maintains its horizontal position, i. e. with its flight level perpendicular to the pendulum axis.

Other objects or features of novelty will be apparent from the following specification when read in connection with the accompanying drawings in which one embodiment of the invention is illustrated by way of example:

In the drawings,

Figure 1 is a somewhat diagrammatic view in elevation of one embodiment of the automatic stabilizer;

Figure 2 is a top plan view of the same;

Figure 3 is a diagram showing an alternative electrical control of the elevators of the aircraft;

Figure 3a is a similar diagram showing the alternative electrical controls for the ailerons;

Figure 4 is a vertical sectional view of one terminus of a "vascular" or liquid level system forming a part of the stabilizer;

Figure 5 is a fragmentary view of the lower portion of the pendulum, partly in elevation and partly in vertical section;

Figure 6 is a detail view in plan of the elevator control;

Figure 7 is a fragmentary vertical sectional view taken substantially at right angles to the section of Figure 5;

Figure 8 is a fragmentary view partly in section of the upper left side portion of the pendulum-stick;

Figure 9 is a horizontal cross-sectional view taken on line 9—9 of Figure 7; and Figure 10 is a view in perspective of one of the sliding pins shown in Figures 7 and 9.

Referring more particularly to Figures 1 and 2 of the drawings, it will be seen that there is represented at P(P') fragmentary portions of the fixed framework of the aircraft. A box-like transverse member D is provided with side and end walls and fixed to each end wall there is a projecting trunnion element E(E'). The ends of these trunnions are pointed and received in conical bearing recesses formed in the frames P(P'). A shaft S passes through openings in the front and rear walls of the member D and extends fore and aft of the aircraft. The extreme forward and rearward ends of the shaft S are received within the eyes 10 of the stems 11 which are connected to the floats 12 which rest upon the surface of the body of liquid 13 contained in the hydraulic stabilizing terminal conduits which are indicated at T(T'). The upper ends of the conduit terminals are blocked by the perforated closure members 15. The p'ping system represented by the reference characters T(T') is in effect a U-shaped tube having a common liquid supply the surface of which will of course remain level with respect to the ground, whereby the respective floats 12 will tend to maintain the shaft S in a horizontal position and therefore keep the member D in a levelled condition regardless of the attitude of the airplane.

Within the elongated transverse slot of the trunnion member D there is positioned a laterally extending block or plate C, having a central narrow portion and flared wings extending therefrom, the wings preferably having arcuate ends. The member C has a vertical central opening to slidably receive the vertical pendulous control stick element H. The stick H has an elongated vertical slot 16 therein which receives the horizontal shaft S and which allows the stick H to be raised to an upper position affording good leverage for normal hand control, or to a lower position affording stabilizer control by the pendulum action of the stick H.

In Figure 1 of the drawings, the stick H is shown in a lowered position approaching the lowermost adjustment afforded by the slot 16. The pilot may raise the stick H to its uppermost position by grasping the upper end, lifting the stick through the slot in the member C until the locking dowel pins 20 (see Figures 1, 7, 9 and 10) register with the opening 21 in the member C. The dowel pins 20 are received within the tapering vertical slots 22 formed in the block 23 which is received for vertical movement within the pocket 24 formed in the stick H at one side of the center line thereof. The slots 22 are provided with transverse interior enlargements 26 within which T-shaped heads 27 of the dowels 20 are adapted to slide. The block 23 is urged toward its lowermost position by means of the spring X which is secured to a plate 28 at the lower end of the stick H. The block 23 is connected by means of a vertical shaft 29 to one arm of a rocking crank lever L which is pivotally mounted at the upper end of the stick H. It will thus be seen that by manipulating the lever, the block 23 may be lifted against the tension of the spring X and the dowel pins 20 will be projected from the walls of the stick H into openings 21 in the member C, whereupon the stick will be retained in its uppermost position for hand control by the pilot.

Upon the ends of the member C are fixed the frames 3(3') each of which is provided with a projection 30 which is connected by means of the stems 31 to one of the floats 32 disposed in the upper ends 1 and 2 of the conduits forming a connected fluid system similar to the one described in connection with the fore and aft stabilization and indicated at T(T'). If desired, all four of the upwardly projecting ends of the tube or conduit system may be connected to a central fixed supply of liquid. It will thus be seen that the hydraulic stabilization just described will tend to keep the member C levelled out transversely of the airplane and will tend to stabilize the plane about its roll axis.

At the right-hand end (as seen in Figures 1 and 2) of the member D, and concentric with the trunnion E, there is fixed a bevel gear F, which meshes with a bevel gear G fixed to a shaft I which (as seen in Figure 6) carries another bevel gear or ratchet wheel 35 which controls the elevator 36 by means of the curved or arcuate rack 37. The rack 37 is rigid with the elevator and this arrangement provides means for tilting the elevator in accordance with the rotation of the shaft I and the bevel gear 35.

Upon the side face of the left hand wing of member C, there is fixed an arcuate rack A which is adapted to mesh with a pinion B carried upon the shaft K which is connected by any suitable or conventional flexible transmission means to the ailerons of the aircraft in order to effect their proper adjustment in accordance with the rocking of the member C.

Alternatively to these mechanical controls, the elevator and ailerons may be adjusted by means of electrical motors, energized from a suitable source of current and controlled by the following means. The trunnion E is threaded as at 40 and a rider N is internally threaded and in mesh with the threads 40 so that rotation of the trunnion E will cause the rider N to move upon its guides O to the right-hand or the left-hand side depending upon the direction of rocking movement of the trunnion so that the member N will make or break contact with the contact elements R having leads 70 and 71 which connect with and thus control the motor 45 which adjusts the elevator 36. Similarly a rider N' is threaded upon the shaft K so that it may be moved along the guides O', carried by the member D, when that shaft is rotated. The rider N' cooperates with the contacts R', also carried by the member D, and thus controls the motor which adjusts the ailerons. In Figure 3 of the drawings there is shown at 45 one of the control motors and a switch 46, placed in the motor circuit from the source of current 100, may be used by the pilot to throw in or cut out the electrical control, when only mechanical control is desired. In Figure 3a a similar motor 45' controls the ailerons 36' by conventional connections and a switch 46' may be used to cut off the energy for the electrical controls from the source 100. Leads 72 and 73 extend from the contacts R' to the motor 41'.

Summarizing the manual operation of the device, it may be pointed out that the manipulation of the stick H in a fore and aft vertical plane will cause the elements C and D to rock about the trunnions E(E') and through the gearing F, G the elevator will be controlled for adjusting the longitudinal attitude or angle of attack of the airplane. Swinging the stick H transversely about the shaft S will cause the member C to rock about that shaft, whatever the position of the pitch control about the trunnions E(E'), and thus the gearings A, B, K will adjust the ailerons to control the roll of the airplane. In a similar manner, when the stick H is lowered to its pendulous stabilizing position, and hand control is released, the pendulum action of the stick aided by the hydraulic levelling action of the "vascular" system will tend to maintain both the pitch and roll controls in a levelled condition.

Referring now more partifularly to Figures 1, 5 and 8 of the drawings, there will be described means for adjusting the pendulum stabilizer in accordance with the air speed of the airplane, so that all other conditions being equal, the angle of attack will be adjusted in accordance with the speed to maintain a constant level of flight. A supplemental counter-weight pendulum Z is provided with upwardly extending arms 50 which are pivoted upon the pins 51 extending from the side walls of the lower portion of the stick H so that the counter-weight and supplemental pendulum Z may swing in a fore and aft direction. Upon the inner face of one of the arms 50 there is formed a rack U which is adapted to mesh with a pinion 53 mounted for rotation within a recess 54 in the stick H and fixed upon the end of a vertical shaft 55. The upper end of the shaft 55 carries the pinion 56 which is rotatable in the recess 57 in the stick H. The pinion 56 meshes with an arcuate segment 57' carried by a hand controlled member 58 which may be set in an adjusted position corresponding to the speed which the plane is to maintain. A bracket 59 attached to the stick H serves to support the control segment 57, 58 and may be graduated in units of air speed to provide corresponding adjustment of the control segment. When the segment 57, 58 is set to a certain speed, the supplemental counterweight pendulum Z is rocked to an angular position with respect to the vertical axis of the stick H which will shift the center of gravity of the stick and thus change the angularity of the axis of the stick with respect to the trunnions E(E') and thus when the pendulum assembly H, Z is in repose, through the action of gravity, the connections F, G, I, etc. will adjust the angle of attack to conform with the air speed of the airplane.

It is known that the lift of an airfoil varies in proportion to the square of the velocity with which it is moving, and that lift increases as the angle of attack increases. Thus with a constant air density, a variation in the angle of attack to compensate for variations in air speed will maintain level flight.

Having thus described the invention, what is claimed as new and desired to be secured by Letters Patent is:

1. In an aircraft having elevators and ailerons for adjusting and maintaining the angular position of the craft about its pitch and roll axes respectively, a control lever adapted to normally occupy an approximately vertical position, means pivotally mounting said lever for swinging movements in both the fore and aft direction and transversely of the craft to actuate the elevators and ailerons respectively, means connecting said device to said elevators and ailerons, means for bodily raising or lowering said lever as a whole relative to its pivot points for manual operation in raised position and for automatic operation in lowered pendulous position, means accommodating said raising and lowering to the said connections whereby their operations are not disturbed by such adjustments of the lever.

2. In an aircraft having elevators for adjusting and maintaining the angle of attack of the aircraft, a pendulous stick for either manual or automatic control of said elevator, operative connections between said stick and said elevator whereby swinging of the stick fore and aft actuates the elevator to vary said angle of attack, a weight carried by the lower end of said stick, means having a manipulative portion mounted at the upper end of said stick in a position readily accessible to the operator for adjusting said weight relative to said stick in a fore and aft direction to move the center of gravity of said stick forwardly and rearwardly of the point of pivotal suspension of said stick in accordance with the air speed of the craft whereby other factors being equal the angle of attack will be maintained at a degree automatically to keep the craft levelled at said speed.

3. In an aircraft having elevators for adjusting and maintaining the angle of attack of the aircraft, a pendulous stick for either manual or automatic control of said elevator, operative connections between the said stick and said elevator, whereby swinging of the stick fore and aft actuates the elevator to vary said angle of attack, a weight pivotally carried by said stick, means at the lower end of said stick for swingingly suspending said weight relative to said stick in a fore and aft direction to move the center of gravity of said stick forwardly and rearwardly of the point of pivotal suspension of said stick in accordance with the air speed of the craft, whereby other factors being equal the angle of attack will be maintained at a degree automatically to keep the craft levelled at said speed, means at the upper end of said stick at a point readily accessible to the operator for swinging said weight to selected positions, means operatively connecting said weight with said last named means, and graduations for gauging the setting of said last named means.

4. In an aircraft having elevators and ailerons for adjusting and maintaining the angular position of the craft about its pitch and roll axes respectively, a control lever adapted to normally occupy an approximately vertical position, means pivotally mounting said lever for swinging movements in both the fore and aft direction and transversely of the craft to actuate the elevators and ailerons respectively, means connecting said device to said elevators and ailerons, means for bodily raising or lowering said lever in its entirety relative to its pivot points for manual operation in raised position and for automatic operation in lowered pendulous position, means accommodating said raising and lowering to the said connections whereby their operations are not disturbed by such adjustments of the lever, a counter-weight carried by said pendulous control lever and adjustable relative thereto, means readily accessible to the operator during flight for adjusting said counter-weight in a fore and aft direction in accordance with the air speed of the craft, whereby the position of repose of said lever and consequently the angle of attack of said craft may be varied in accordance with said air speed and horizontal flight attained at such speed.

5. Automatic control means for aircraft comprising a pitch control stick pendulously suspended from a pivotal point, means for connecting said stick with the elevator of an aircraft, a counter-weight pivotally suspended from the lower end of said stick and swingably adjustable in a fore and aft direction, arms extended upwardly from said counter-weight, embracing the lower end of said stick, and pivotally connected with said stick, a substantially horizontal rack on one of said arms, a pinion seated in a recess in said stick, a shaft fixed to said pinion and rotatably carried by said stick and extending upwardly to a point readily accessible to the pilot, and manually operable means for rotatably adjusting said shaft, a graduated scale carried by said stick adjacent said manually operable means whereby the manually operable means may be set to adjust the angular position of said counter-weight, the center of gravity of the pendulous stick as a whole, and the angle of repose of said stick about its pivotal point, to maintain the appropriate angle of attack for a given speed.

6. Control means for aircraft having elevators and ailerons comprising a transversely extending member trunnioned in said craft for rotation about a transverse horizontal axis, a pivot pin on said member extending in the direction of the roll axis of the craft, a second transversely extending member mounted on said pivot pin for independent rocking movement about a longitudinal axis and also for conjoint rocking movement about said transverse axis with said first named member, a stick vertically slidably received in said second named member, and provided with a vertically elongated slot receiving said pivot pin, gearing between said respective rocking members and the elevator and ailerons, whereby fore and aft swinging movement of said stick will actuate said elevator and transverse swinging movement will actuate said ailerons, said pin and slot connection enabling said stick itself to be bodily movable from a pendulous automatic stabilizing lower position relative to said pivot pin to an upper position affording better leverage for manual operation, and manually actuable means for locking said stick to said second-named member in said upper position.

7. A device as set forth in claim 6 in which said locking means comprises a bolt projectable from said stick element into a recess in said second-named rocking member, a head on said bolt, a block slidable within said stick, an inclined slot in said block having a widened portion to receive the head of the bolt, and manually operable means for raising and lowering said block within the stick and projecting and retracting said bolt.

JOSÉ MARQUES.

REFERENCES CITED

The following references are of record in the file of this patent:

UNITED STATES PATENTS

| Number | Name | Date |
|---|---|---|
| 1,286,860 | White | Dec. 3, 1918 |
| 1,418,335 | Sperry | June 6, 1922 |
| 1,475,869 | Petrie | Nov. 27, 1923 |
| 1,491,310 | Perrin | Apr. 22, 1924 |
| 1,509,743 | Wegner | Sept. 23, 1924 |
| 1,782,149 | Salisbury et al. | Nov. 18, 1930 |
| 1,832,254 | Spanovic | Nov. 17, 1931 |
| 1,842,952 | Salisbury et al. | Jan. 26, 1932 |
| 2,005,530 | Boykow | June 18, 1935 |
| 2,066,194 | Bates | Dec. 29, 1936 |
| 2,076,088 | Malinowski | Apr. 6, 1937 |

FOREIGN PATENTS

| Number | Country | Date |
|---|---|---|
| 287,960 | Great Britain | Mar. 26, 1928 |
| 708,508 | France | May 4, 1931 |